United States Patent
Frauenhuber et al.

(10) Patent No.: US 10,072,701 B2
(45) Date of Patent: Sep. 11, 2018

(54) DRIVER ROLLER OF A WINDING DEVICE OF A ROLLING MILL, AND METHOD FOR PRODUCING SAME

(71) Applicant: PRIMETALS TECHNOLOGIES AUSTRIA GMBH, Linz (AT)

(72) Inventors: Klaus Frauenhuber, Linz (AT); Friedrich Moser, Hellmonsoedt (AT); Juergen Schiefer, Allhaming (AT); Johann Stadlmair, Linz (AT)

(73) Assignee: PRIMETALS TECHNOLOGIES AUSTRIA GMBH (AT)

( * ) Notice: Subject to any disclaimer, the term of this patent is extended or adjusted under 35 U.S.C. 154(b) by 33 days.

(21) Appl. No.: 14/650,490

(22) PCT Filed: Oct. 17, 2013

(86) PCT No.: PCT/EP2013/071743
§ 371 (c)(1),
(2) Date: Jun. 8, 2015

(87) PCT Pub. No.: WO2014/086527
PCT Pub. Date: Jun. 12, 2014

(65) Prior Publication Data
US 2015/0308493 A1    Oct. 29, 2015

(30) Foreign Application Priority Data
Dec. 7, 2012   (EP) .................................. 12196038

(51) Int. Cl.
*F16C 13/00* (2006.01)
*B21C 47/34* (2006.01)
*B21B 39/00* (2006.01)

(52) U.S. Cl.
CPC ............ *F16C 13/00* (2013.01); *B21B 39/006* (2013.01); *B21C 47/34* (2013.01)

(58) Field of Classification Search
CPC ... F16D 1/02; F16D 1/033; F16D 1/06; F16D 1/076; F16D 1/0852; F16D 1/087;
(Continued)

(56) References Cited

U.S. PATENT DOCUMENTS

| 119,504 | A | * | 10/1871 | Brooks | .................... | F16H 55/36 |
| | | | | | | 193/37 |
| 314,470 | A | * | 3/1885 | Pierce | ..................... | B27B 25/02 |
| | | | | | | 144/246.1 |

(Continued)

FOREIGN PATENT DOCUMENTS

| CN | 1062105 A | 6/1992 |
| CN | 1440315 A | 9/2003 |

(Continued)

OTHER PUBLICATIONS

International Search Report dated Jan. 24, 2014 issued in corresponding International Patent Application No. PCT/EP2013/071743.

(Continued)

*Primary Examiner* — Jason L Vaughan
(74) *Attorney, Agent, or Firm* — Ostrolenk Faber LLP (57) ABSTRACT

A driver roller (1, 18) having a rolling body (22) and at least one axle shaft journal (3, 5, 19, 32). The at least one axle shaft journal (3, 5, 19, 32) is fixed to the rolling body (22) indirectly via at least one support element (4, 6, 21, 25, 27, 29), which is fixed to the rolling body (22), by means of removable connecting means. The at least one axle shaft journal (3, 5, 32) is arranged such that the longitudinal axis of the journal is coaxial to the longitudinal axis of the rolling body (22), and the axle shaft journal is a separate component. The support element (4, 6, 21, 25, 27, 29) has the shape of a ring or a disk with a groove (30) in an end wall of the ring- or disk-shaped support element (4, 6, 21, 25, 27, 29). The support element (4, 6, 21, 25, 27, 29) has a flange (31)

(Continued)

on which the axle shaft journal (3, 5, 19, 32) is flange-mounted. Such a driver roller can be easily assembled from modules, thereby simplifying maintenance and storage.

19 Claims, 8 Drawing Sheets (58) Field of Classification Search
CPC .. F16D 1/072; B21B 1/22; B21B 1/24; B21B 1/26; B21B 27/02; B21B 27/021; B21B 27/03; B21B 27/032; B21B 35/14; B21B 35/141; B21B 35/10; B21B 2035/103; B21B 2035/106; B21B 31/08; B21B 2015/0057; B21B 2015/0064; Y10T 403/642; Y10T 403/645; B65H 27/00; B65H 29/12; B65H 29/125; B65H 29/32; B65H 2301/443; B65H 2301/4431; B65H 2301/44318; B65H 2301/44324; B65H 2301/44326; B65H 2402/522; B65H 2402/5221; B65H 2402/63; B65H 2404/162; B65H 2404/173
USPC .......................................... 492/47; 242/327.2
See application file for complete search history.

(56) References Cited

U.S. PATENT DOCUMENTS

| | | | | |
|---|---|---|---|---|
| 1,063,790 A * | 6/1913 | Greaves | ..................... | F16D 1/06 403/259 |
| 1,241,324 A * | 9/1917 | Alvey | ..................... | F16C 13/02 193/37 |
| 1,454,305 A * | 5/1923 | Wilson | ..................... | F16H 55/38 301/53 |
| 1,752,675 A * | 4/1930 | Larson | ..................... | B65G 39/02 193/37 |
| 1,775,505 A * | 9/1930 | Baccellieri | ............. | A21C 11/00 425/189 |
| 1,784,848 A * | 12/1930 | Reichle | ................... | B65G 39/09 384/419 |
| 1,872,062 A * | 8/1932 | Burke | ..................... | F27D 3/026 432/246 |
| 1,875,068 A * | 8/1932 | Malby | ..................... | B65H 75/14 220/621 |
| 2,027,451 A * | 1/1936 | Rooney | ................... | B65H 20/02 226/118.1 |
| 2,491,917 A * | 12/1949 | Brouwer | ................ | D03D 49/20 139/304 |
| 2,543,507 A * | 2/1951 | Rancourt | ............... | B65H 75/10 242/118.6 |
| 3,037,557 A * | 6/1962 | Faeber | ................... | B65H 27/00 100/162 B |
| 3,097,591 A * | 7/1963 | Justus | ..................... | B65H 27/00 100/155 R |
| 3,222,884 A * | 12/1965 | Lyle | ....................... | B21B 35/141 242/571.3 |
| 3,620,061 A * | 11/1971 | Cunningham et al. | ....................... | B21B 11/00 492/1 |
| 3,805,550 A * | 4/1974 | Patton | ..................... | F16C 13/00 492/15 |
| 4,040,158 A * | 8/1977 | Payne | ................... | B21B 39/008 492/1 |
| 4,043,622 A * | 8/1977 | Hotchkiss | ................. | D21F 1/40 384/587 |
| 4,130,911 A * | 12/1978 | Clark | ..................... | A46B 13/02 15/179 |
| 4,920,627 A * | 5/1990 | Aikins | .................... | B23P 15/00 29/402.08 |
| 5,441,358 A * | 8/1995 | King | ....................... | F16D 1/033 403/30 |
| 5,547,448 A * | 8/1996 | Robertson | ............... | F16C 13/00 492/16 |
| 5,836,500 A * | 11/1998 | Jourde | ................... | B65H 27/00 226/189 |
| 6,110,093 A * | 8/2000 | Slusarz | .................... | B41F 13/08 492/21 |
| 6,755,299 B2 * | 6/2004 | Itoh | ......................... | B65G 39/09 193/37 |
| 8,973,304 B2 * | 3/2015 | Sano | ....................... | B23B 31/40 269/48.1 |
| 2002/0038696 A1 | 4/2002 | Fukase et al. | | |
| 2005/0277480 A1 * | 12/2005 | Breese | ..................... | F16D 1/033 464/179 |
| 2007/0149376 A1 * | 6/2007 | Holtmann | .............. | B65H 20/12 492/16 |
| 2013/0343804 A1 * | 12/2013 | Esposito | ................. | B21B 35/14 403/24 |

FOREIGN PATENT DOCUMENTS

| | | |
|---|---|---|
| CN | 201676880 U | 12/2010 |
| CN | 202070559 U | 12/2011 |
| DE | 44 42 567 A1 | 6/1996 |
| EP | 0 747 147 A2 | 12/1996 |
| JP | S53-6778 Y2 | 2/1978 |
| JP | H01-134184 U | 9/1989 |
| JP | H03-72114 | 7/1991 |
| JP | H05 269524 | 10/1993 |
| JP | H08-193617 A | 7/1996 |
| SU | 403461 | 10/1973 |
| WO | WO 02/02253 A1 | 1/2002 |
| WO | WO 2005/061143 | 7/2005 |

OTHER PUBLICATIONS

Written Opinion dated Jan. 24 2014 issued in corresponding International Patent Application No. PCT/EP2013/071743.
European Search Report dated May 23, 2013 issued in corresponding European Patent Application No. 12 19 6038.
Notice of Reasons for Rejection dated Aug. 1, 2016 in corresponding Japanese Patent Application No. 2015-545707 with English language translation (12 total pages).
First Office Action dated Apr. 28, 2016 in corresponding Chinese Patent Application No. 201380064043.X with Search Report (English language translation)(11 total pages).
Chinese Office Action dated Sep. 18, 2017 in corresponding Chinese Patent Application No. 201380064043.X, with an English translation of portions thereof.
Russian Office Action dated Aug. 22, 2017 in corresponding Russian Patent Application No. 2015127103(042143).

* cited by examiner

DRIVER ROLLER OF A WINDING DEVICE OF A ROLLING MILL, AND METHOD FOR PRODUCING SAME

CROSS REFERENCE TO RELATED APPLICATIONS

The present application is a 371 national phase of International Application No. PCT/EP2013/071743, filed Oct. 17, 2013, which claims benefit of European Application No. 12196038.9, filed Dec. 7, 2012, the contents of which are incorporated herein by reference. The International Application was published in the German language.

TECHNICAL FIELD OF THE INVENTION

The present application relates to drive rollers, having stub axle shafts which are affixed by means of detachable fixing arrangements, together with a method for their manufacture.

BACKGROUND OF THE INVENTION

In a rolling mill for the production of metal strips, for example a rolling mill for the production of steel strip, the metal strips are coiled up in coiling facilities at the end of the production process. The coiling facilities have so-called drive facilities, also called drivers. In these, the metal strip is stretched between a pair of rollers, the metal strip's direction is reversed and then driven to wind it up onto the coil. The typical use of drivers is in rolling lines, where the drivers are arranged before hot-rolled strip coilers. During the process of coiling up, their functions include among others that of adjusting the front tension ahead of the coiling unit by means of a pair of rollers, also called drive rollers, namely the drive roller and the reverse drive roller. In this arrangement, the drive roller is located above the reverse drive roller. The drive roller is generally constructed as a hollow roller, and the reverse drive roller generally as a solid roller.

Conventional rollers are often used for drive rollers, they are hollow right through—and are called hollow rollers. The disadvantage with hollow rollers is that they must be provided with welded axle shafts right through them. Due to the high mechanical loading placed on them, these axle shafts are mostly manufactured from special forged steels, which require special manufacturing and welding machines because of their dimensions. Such axle shafts are thus difficult to manufacture, which makes their production expensive and time-consuming and results in long delivery lead-times. Long delivery lead-times, for example up to 6 months in the case of drive rollers for a rolling mill driver, are a factor which leads to increased costs for stockholding. In addition, greater financial resources are tied up so that the production of the rolling mill does not suffer detrimental effects from the problems of regular replacement of worn-out drive rollers and reverse drive rollers.

The drive rollers wear out parts which, because of the need to replace them regularly, requires the operator of a rolling mill to constantly have an adequate number in store.

In a rolling mill, drive rollers are used during rolling for the production of metal strips, for example steel strips or aluminum strips.

Since rolling lines are subject to a constant process of development, coiling facilities are continuously being extended or modified. A consequence of this is that there are generally drivers with various types of construction installed in a rolling line. The dimensions of the stub axle shafts are adapted for the relevant coupling dimensions or, as applicable, to the relevant distance between the bearings of the drive rollers or the reverse drive rollers, and hence drive rollers with different dimensions are used. Another disadvantage of drive rollers in accordance with the prior art is that in the drivers for different rolling lines use is often made of drive rollers and reverse drive rollers of different lengths. The dimensions of the drive rollers and the reverse drive rollers are determined according to the maximum width of strip produced on the individual rolling lines. This means that it is often impossible to exchange drive rollers and reverse drive rollers for one rolling line by the drive rollers and reverse drive rollers for other rolling lines.

The reasons just described have the consequence that it is costly to hold an adequate reserve stock of drive rollers and reverse drive rollers, and doing so ties up substantial financial resources.

SUMMARY OF THE INVENTION

Technical Objective

It is the objective of the present invention to make available drive rollers and reverse drive rollers for which these disadvantages in the prior art are avoided, together with a method for their manufacture. In addition, these inventive drive rollers should be so designed that the loadings which arise in operation are borne without major wear.

Technical Solution

The objective is achieved by a
drive roller
incorporating
  a roller body,
  at least one stub axle shaft,
where the at least one stub axle shaft is affixed
  indirectly
    through at least one carrier element which is itself affixed to the roller body
  by means of detachable fixing arrangements onto the roller body,
where the at least one stub axle shaft is arranged so that its longitudinal axis is coaxial with the longitudinal axis of the roller body
and where the at least one stub axle shaft is a separate component,
and where the carrier element is constructed as a ring- or disk-shape, with a groove in an end face of the ring- or disk-shaped carrier element,
and the carrier element has a flange, onto which the stub axle shaft has a flange mounting.

The term drive roller covers both drive rollers and reverse drive rollers.

The term roller body is to be understood as that part of the drive roller which has the surface which, when in operation, makes contact with the metal strip.

Preferably, the drive rollers concerned are those which are used in rolling mills for the production of strip or plates from steel or aluminum.

Preferably, the drive rollers concerned are those which are used in a hot-rolling mill. Most preferably, the drive rollers concerned are those used in a wide strip line in a hot-rolling mill; here, a wide strip line is to be understood as a strip line with a strip width of 1200 mm and more.

The roller body of the inventive drive roller can, for example, be hollow along its entire lengthwise extent called a hollow roller or not hollow for the full length called a solid roller. Here, a solid roller can have hollow spaces for example along its longitudinal axis from one of its end faces, in each case towards the other end face.

The external diameter of the roller body can, for example, have the same dimension across the complete effective width of the roller body, or its length, so that the effective width or the roller body as a whole is cylindrical. The external diameter of the roller body can also vary, so that it is not cylindrical in shape but rather, for example, is barrel-shaped or conical. The external diameter can also, for example, be the same over one or more sections along the longitudinal extent of the roller body, and vary in other sections of the roller body, for example a barrel-shaped central section bounded by two cylindrical end sections.

The at least one stub axle shaft is arranged with its longitudinal axis coaxial with the longitudinal axis of the roller body. In operation, the inventive drive roller rotates about this longitudinal axis. The at least one stub axle shaft is a separate component, that is, it is not simply an extension of the roller body or an end section of a full length axle shaft.

A single stub axle shaft may be present, preferably there will be two stub axle shafts present. In this preferred case, both the stub axle shafts are arranged with their longitudinal axes coaxial. In operation, the inventive drive roller rotates about the longitudinal axis of the roller body, about an axis which includes the two stub axle shafts.

If there are two, or more than one, stub axle shafts present, these are separate bodies; in a drive roller in accordance with the invention they are thus only indirectly joined to each other, for example through the roller body and carrier elements.

The term indirectly affixed is to be understood as being that a stub axle shaft is not itself affixed to the roller body, but to a body which is itself in turn affixed directly or indirectly onto the roller body. In the context of this application, such a body is described as a carrier element. A carrier element can also be indirectly affixed onto the roller body, that is to say that it is affixed to a further carrier element which is itself directly or indirectly affixed onto the roller body.

A carrier element can be affixed onto the roller body by means, for example, of fixing elements such as screws or welding, directly or indirectly, detachably or non-detachably. It can also, for example be affixed to the roller body by a friction fit produced by shrinking on.

A carrier element is constructed with a ring-shape or disk-shape. It can also consist of several parts which, when put together, form the ring- or disk-shaped carrier element. In accordance with one form of embodiment, at least one carrier element is affixed to the roller body so that it can be detached.

If there is more than one stub axle shaft present, then it is preferred that one stub axle shaft is affixed indirectly onto each half of the longitudinal extent of the roller body. In this case, the stub axle shaft can be affixed to the end of the roller body, so for example being affixed indirectly to its end face or onto some other place on the longitudinal extent of the relevant half of the roller body, for example inside a hollow space in the roller body.

In accordance with the invention, the ring- or disk-shaped carrier element has a groove in an end face of the carrier element. The term end face is to be understood here as the end or closing surface of the cylinder represented by the ring- or disk-shaped carrier element, but not its cylindrical surface.

In accordance with the invention, the carrier element has a flange onto which the stub axle shaft is flanged.

Advantageous Effects of the Invention

In accordance with the invention, the at least one stub axle shaft is affixed to the roller body by means of a detachable fixing arrangement.

The formulation "by means of a detachable fixing arrangement" is here to be understood as a fixing by means of a fixing arrangement which can be non-destructively separated; for example, a fixing by means of a screwed joint for example in a flanged joint, a dismantlable clamp, a claw linkage.

A stub axle shaft can in various ways be affixed indirectly that is via a carrier element onto the roller body so that it is detachable. The carrier element can be affixed to the roller body so that it can be detached and a stub axle shaft mounted on the carrier by means of a detachable fixing arrangement or by means of non-detachable fixing arrangement. Alternatively, the carrier element can be affixed non-detachably to the roller body with a stub axle shaft mounted on it and affixed by means of a detachable fixing arrangement.

The formulation "affixed by means of a non-detachable fixing arrangement" is here to be understood as affixing with a fixing arrangement which can only be detached by destructive methods, for example a welded joint.

In respect of the fixing of the stub axle shaft by means of a detachable fixing arrangement, the following applies: it is meant in the sense that at least one fixing by means of detachable fixing arrangements is used. Apart from this fixing by means of detachable fixing arrangements, fixing by means of non-detachable fixing arrangements may also be used. For example, the stub axle shaft can be detachably affixed to the flange by means of screws, and the separating line between the stub axle shaft and the flange provided in addition with a welded seam as a fixing by means of a non-detachable fixing arrangement.

Because the stub axle shafts are affixed onto the roller body indirectly in accordance with the invention, by means of a detachable fixing arrangement, they can be changed more simply and more rapidly than conventional continuous axle shafts or conventional stub axles shafts affixed by means of non-detachable fixing arrangements. Further, the stub axle shafts affixed by means of a detachable fixing arrangement can be changed as soon as a change is necessary, for example due to wear.

In accordance with the invention, the carrier element has a flange onto which the stub axle shaft is flanged. As a result, the stub axle shaft can be attached to or detached from the carrier element easily and rapidly. This simplifies the manufacture and maintenance of the inventive drive roller. For example, for maintenance work on the roller body it is possible to effect the rapid exchange of a stub axle shaft designed for the operation of the drive roller by another stub axle shaft designed specifically for maintenance work. If this stub axle shaft is damaged during the maintenance work, the damage does not prevent the installation for operational work of the maintained drive roller, because it can immediately be replaced by the stub axle shaft designed for operation of the drive roller.

Equally, a roller body can be simply prepared for deployment in a different driver, which requires stub axle shafts with different dimensions, so that a stub axle shaft suitable for the other driver can be flanged on.

A flanged joint can be rapidly done up and undone, and can withstand the loadings which arise in the operation of a driver.

The groove present in accordance with the invention in an end face of the carrier element ensures that the system comprising roller body, carrier element and stub axle shaft has sufficient elasticity to permit a flow of force between the stub axle shaft and the roller body without damage to or failure of the drive roller. The groove mainly gives the system bending flexibility. In addition, a carrier element which has a groove can damp the peaks in the loading and tensions arising in the operation of the drive roller. It thus serves inventively not only as a force-transmitting element, but also as a force damping element.

After a certain time in operation (for example approx. 200,000 t of rolled steel hot strip) drive rollers must be reconditioned. Special reconditioning work, such as build-up welding of a wear area, can only be carried out by specialist companies. In the case of conventional drive rollers, the complete drive rollers must be sent to these companies in their assembled state. The design of the inventive drive rollers means that in their case, it is easy to dismount the stub axle shafts from the roller body so that only the roller body, as an individual part which must be reconditioned, needs to be sent. This leads to lower transport costs. Furthermore, the parts which do not need reconditioning continue to be available for production use.

In addition, the inventive drive rollers can more easily be provided with surface layers. For example, there is a danger when welding surface layers onto a conventional drive roller that the stub axle shaft is damaged during its dismounting or the preheating of the drive roller, or by the heat during the build-up welding, and must itself then be remanufactured. Due to the fact that, in the case of the inventive drive rollers, as described above, the stub axle shafts can easily be undone, it is easy to carry out work steps on the roller body without this having detrimental effects on a stub axle shaft. The welding machines which are required for the build-up welding can be smaller in design than for conventional drive rollers.

Overall, the consequence is that the expense of holding stocks of replacements for worn drive rollers is reduced, because when wear occurs it is not necessary to exchange the complete drive roller, but an exchange of the detachable stub axle shaft concerned is sufficient.

Due to the fact that the inventive drive roller unlike the prior art which often uses a continuous axle shaft provided as a separate component, or stub axle shafts designed as an extension of the roller body and manufactured in one piece with the roller body, or stub axle shafts affixed to the roller body by non-detachable fixing arrangements is provided with at least one stub axle shaft which is affixed by a detachable fixing arrangement, a drive roller in accordance with the invention can be made more quickly and more cheaply. The stub axle shafts, which are short by comparison with a continuous axle shaft, are easier and quicker to manufacture than a continuous axle shaft. In addition, the manufacture of a roller body, on which it is not necessary to provide a projection as a stub axle shaft, is simpler and faster to manage.

A design of drive rollers which have a stub axle shaft affixed using a flange and by means of detachable fixing arrangements, has not previously been made in the prior art because until now the assumption has been made that such a joint would be unable to adequately withstand the loadings on drive rollers which occur in operation. In operation, torques of the order of magnitude of $10^4$ Nm arise, together with enormous bending moments which are evoked by start-up forces in the order of magnitude of $10^3$ kN. It has now been found that a drive roller constructed in accordance with the invention with a detachable fixing arrangement is after all suitable for operations in a rolling mill in operation the inventive design with a flanged joint does stand up to such loadings.

The use of stub axle shafts affixed by detachable fixing arrangements makes it easier, by comparison with the prior art, to take into account the different prevailing situations in various drivers, for example the distance between the bearings for the drive rollers, the internal diameters of the bearings and the coupling attachment. For example, instead of a complete drive roller, with an appropriate length continuous axle shaft, it is only necessary to produce a short stub axle shaft.

In a rolling mill, some types of drive rollers are driven by means of an appropriate drive unit. Accordingly, at least the stub axle shafts with which the drive units engage are affixed to the roller body in such a way that torques for the purpose of driving the drive roller can be transmitted from the drive unit to the roller body. For the purpose of transmitting torques, feather keys can, for example, be provided in appropriate pairs of grooves in the roller body and/or the carrier element and/or the stub axle shaft.

Preferably there will be two axle shafts which, in accordance with the invention, are affixed by means of detachable fixing arrangements.

The groove will preferably be a circular groove. In accordance with another embodiment, the groove runs concentrically with the axis of rotation of the carrier element.

Here, the term axis of rotation is to be understood as the axis of symmetry of the carrier element as a rotating body, which is in fact ring- or disk-shaped.

In accordance with another embodiment, the central area of the carrier element, which is bounded by the groove, is formed as the flange.

In accordance with another preferred embodiment, the groove has a V-profile. It may also basically have a U-profile or rectangular profile. On production engineering grounds, and because of its damping and elasticity behavior, a V-profile is preferred.

These inventive forms of embodiment ensure optimized elasticity and damping.

The central area, constructed as a flange, will preferably project beyond the plane extending across the outer edge of the face which has the groove.

The flange will preferably be flared outwards. This simplifies handling during the affixing or release of the flanged joint to the stub axle shaft.

In accordance with one preferred embodiment, the roller body has at least one hollow space, extending along its longitudinal axis, if necessary over the entire lengthwise extent of the roller body.

The drive roller can thus be either a hollow roller or a solid roller.

In accordance with another embodiment, the carrier element is inserted into the hollow space and if necessary is affixed there onto the roller body.

This approach makes it possible to react to the fact that the distances between the bearings, even for one type of drive roller, can be arranged at different distances apart in a rolling mill or in different mills. This is effected by inserting carrier elements into the hollow space to different depths, depending on the bearing spacing situation.

Preferably, there will be at least one limit stop element present in the hollow space.

The term limit stop element is to be understood as a part of a roller body, or a body affixed in the hollow space in the roller body, which is suitable for setting a limit on how far a stub axle shaft and/or a carrier element can be inserted into the hollow space in the direction of the longitudinal axis of the roller body. The limit stop element could, for example, be a step which narrows the hollow space, or the end of the hollow space. If a carrier element is introduced as far as the limit stop element into a hollow space which has a limit stop element, this eliminates the danger that, under the loadings during operation of the drive roller, the carrier element migrates further in the direction of the limit stop element in the hollow space, and thereby causes problems with the bearings for the drive roller.

In accordance with another embodiment there is arranged in the inventive drive roller
between
 at least one limit stop element
 and
 a carrier element
at least one spacing element.

The spacing element is suitable for setting a limit on how far into the roller body it is possible to insert a carrier element into the hollow space, in the direction of the longitudinal axis of the roller body, when this limit is at a different position from that set by the limit stop element. For example, the spacing element could be a ring which is pushed into the hollow space as far as the limit stop element, where the edge of this ring which is facing away from the limit stop element sets a limit on how far the carrier element can be introduced into the hollow space in the direction of the longitudinal axis of the roller body.

It is then no longer possible for carrier elements to be moved into the hollow space as far as the limit stop element, but only until they come up against the spacing element. By the insertion of a spacing element, or the choice of its width, as applicable, the limit for a movement of the carrier element in the direction of the longitudinal axis of the roller body can be varied without having to change the position of the limit stop element.

In this way, constructional requirements of the rolling mill, for example the distance between the bearings, can be simply taken into account. Different types of drivers can, for example, require different distances between the stub axle shafts, because the bearings for the axle shafts are arranged with different distances between them. Therefore, a drive roller in accordance with the invention can be deployed in different types of drivers without requiring different manufacturing processes for the roller body in order to position the limit stop element at different places in the roller body. The use of spacing elements enables different distances between two stub axle shafts to be set for a single position of the step.

In the case of a hollow roller with two stub axle shafts, affixed in accordance with the invention so that they can be dismantled, a carrier element which carries a first stub axle shaft can function as a limit stop element, beside which is arranged a spacing element which abuts a carrier element which carries the second stub axle shaft.

In accordance with a preferred embodiment, the effective width of the drive roller is formed both by the surface shell of the roller body and also by a surface shell extension element, which if necessary may be present between the carrier element and the roller body.

The term surface shell means the outer surface of the roller body which, in operation, comes into contact with the metal strip. The term effective roller width is to be understood as the usable width of a drive roller.

In accordance with a preferred embodiment, at least one surface shell extension element is a carrier element.

In this way, it is a simple matter to increase the length, and hence the effective width, of a drive roller in accordance with the invention. This may be necessary, for example, if a wider metal strip is to be processed. The length of the drive roller must be adjusted appropriately for the width of the metal strip, because the drive roller is used with its longitudinal axis at right angles to the length of the metal strip.

The surface shell extension element could be made, for example, as a wear tube sleeved onto a carrier element, which can be affixed onto the carrier element and/or the roller body. It can also be positioned between the carrier element and the roller body, wherein it can be either directly or indirectly affixed onto the roller body or onto a carrier element, preferably so that it can be dismantled.

The use of a surface shell extension element offers the advantage that in operation it is positioned precisely in the region of the strip edges, which are subject to particularly high wear. If the drive roller is worn down in this region, it is not absolutely necessary to replace the entire roller body, but it may be sufficient to replace solely the surface shell extension element.

The surface shell extension element can be made of some other material, preferably a more wear-resistant one, than the roller body.

A drive roller in accordance with the invention is not made in one piece, but incorporates several modules from the following group of modules: roller body, carrier element, stub axle shaft, surface shell extension element, spacing element, limit stop element. These modules are smaller than a drive roller made in one piece, and thus can be manufactured and stocked more simply, faster, and in a more cost-effective manner. The use of dismantable joints in the inventive drive roller permits individual worn modules to be simply replaced by fresh modules the maintenance of a drive roller in accordance with the invention is thereby simpler than for one made in one piece or for driver rollers which have non-dismantable joints. In addition, it is possible to respond quickly to varying wishes as to the configurations of a drive roller, by combining modules appropriate for the configuration concerned—for example it is possible to use spacing elements of different widths in order to deal with different distances between the axle shaft bearings, or different surface shell extension elements can be used to lengthen the drive roller by different amounts.

The inventive drive rollers will be put together from the modules when required, which is less time-consuming than making a complete drive roller from scratch. By this means, the expense of stockholding and the corresponding tying up of financial resources can be reduced.

The fewer versions of a type of module which are used, the simpler and more cost-effective can the stockholding be, and the cheaper will the modules be because they are required and made in larger quantities.

Another aspect of the present application is a method for the manufacture of a drive roller in accordance with the invention, which includes the steps:
 combine
at least the following modules
 a roller body,
 a stub axle shaft, and
 a carrier element, and which, if necessary also includes the steps:
  combine at least one of the modules from the group of:
    a surface shell extension element
    a spacing element, and
    a limit stop element
  with the modules of the roller body, the stub axle shaft, and the carrier element.

Here, the term combine is to be understood as: place together for the purpose of building up the drive roller and, where necessary, affix to one another, directly or indirectly, if necessary by means of dismantlable fixing arrangements.

In accordance with the invention, at least the steps to combine the roller body, the stub axle shaft and the carrier element modules are carried out.

As described above, the modular construction enables numerous configurations of the drive roller to be produced by the combination of suitable modules.

In accordance with one preferred form of embodiment of the inventive method, the roller body module is shortened to the desired length before any module is combined with the roller body module.

It is possible in this way to lower the manufacturing and stockholding costs for the roller body module, as well as the delivery lead time. It is, for example, possible to manufacture and hold in stock the roller body module in a single length, for example the maximum length required, and if needed to reduce it to a shorter length.

Shortening thus offers an enhancement to the options already cited for varying the length by means of surface shell extension elements.

A further subject of the invention is the use of a drive roller in accordance with the invention, or a drive roller manufactured using the inventive method, as applicable, in a rolling mill for the production of metal strip, preferably steel strip, and more preferably in a hot strip coiling facility for steel strip. A drive roller in accordance with the invention, or a drive roller manufactured using the inventive method, as applicable, can also be used for the production of aluminum strip, or for the production of steel or aluminum plate.

In the case of a drive roller in accordance with the invention which is made in the form of a hollow roller, so the roller body is a tubular shell, two stub axle shafts are affixed to the roller body indirectly via at least on carrier element, itself affixed to the roller body, wherein both stub axle shafts are affixed by means of detachable fixing arrangements. The arrangement is then a drive roller, incorporating
  a tubular shell
  a first stub axle shaft,
  a second stub axle shaft,
  where the first stub axle shaft is affixed, indirectly via at least one carrier element which is itself affixed to the tubular shell by means of detachable fixing arrangements to the tubular shell in the region of a first half of its lengthwise extent, and
  where the second stub axle shaft is affixed, indirectly via at least one carrier element which is itself affixed to the tubular shell to the tubular shell in the region of a second half of its lengthwise extent, where it is preferably affixed by means of detachable fixing arrangements,
  and
  where the first stub axle shaft and the second stub axle shaft are arranged with their longitudinal axes coaxial, and where the first stub axle shaft and the second stub axle shaft are two bodies which are separate from each other;
  and where the carrier element is ring-shaped or disk-shaped in construction, with a groove in a face of the ring- or disk-shaped carrier element,
  and the carrier elements have flanges, onto which are flanged the stub axle shafts.

The tubular shell is a component of the drive roller which has the surface which comes into contact with the metal strip in operation.

The external diameter of the surface shell can, for example, have the same dimension across the complete effective width so that the tubular shell as a whole is cylindrical. The external diameter of the roller body can also vary, so that it is not cylindrical in shape but its surface is, for example, barrel-shaped. The external diameter can also, for example, be the same over one or more sections along the longitudinal extent of the tubular shell, and vary in other sections of the roller body, for example a barrel-shaped central section can be bounded by two cylindrical end sections.

Instead of the continuous axle shaft often used in the prior art, the inventive drive roller has two stub axle shafts. These two stub axle shafts are two separate bodies from each other and are not simply the end sections of a continuous axle shaft. The two stub axle shafts are arranged with their longitudinal axes coaxial. In operation, the inventive drive roller rotates about an axis of rotation formed by the two stub axle shafts. This axis of rotation is coaxial with the longitudinal axis of the tubular shell.

Here, the term indirectly affixed is to be understood as meaning that a stub axle shaft is not affixed to the tubular shell itself, but to a body which is itself directly or indirectly affixed to the tubular shell. Such a body is referred to in the context of this application as a carrier element. A carrier element can also be affixed indirectly to the tubular shell that is to say it is affixed onto a further carrier element which is itself affixed directly or indirectly onto the tubular shell.

For example, a carrier element can be affixed directly or indirectly onto the tubular shell by means of fixing elements, such as for example screws. It can also, for example, be affixed to the tubular shell by shrinking on, by a friction fit, or by welding.

Attached indirectly to each half of the longitudinal extent of the tubular shell is a stub axle shaft. Here, the stub axle shaft can be affixed to the end of the tubular shell, or at some other place on the longitudinal extent of the relevant half of the tubular shell.

Because the inventive drive roller has two stub axle shafts instead of one continuous axle shaft, such as is commonly used under the prior art, a drive roller in accordance with the invention can be manufactured more quickly and more cheaply. The stub axle shafts, which are short compared to a continuous axle shaft, can be manufactured more easily, more rapidly and more cost-effectively than a continuous axle shaft.

In addition, the use of two stub axle shafts arranged separately makes it possible to adapt the drive roller for the different connection dimensions which may apply for various drivers, such as for example the distance between the bearings, bearing internal diameter and coupling connections, and subsequently to be used and operated in different drivers. This adaptation can be effected in that the stub axle shaft is made appropriate for the required connection dimensions, and attached to the tubular shell. By comparison with a continuous axle shaft, it is easier to take into account different connection dimensions.

In accordance with one embodiment, at least one carrier element is affixed to the tubular shell by means of detachable fixing arrangements.

At least one, preferably each, of the two stub axle shafts affixed to the tubular shell is affixed to the tubular shell or carrier element by means of detachable fixing arrangements, for example by means of screwed jointing of a flanged joint, a clamp joint, or a claw coupling.

In accordance with another embodiment, at least one limit stop element is present in the tubular shell.

The term limit stop element is to be understood as a part of a tubular shell, or a body affixed in the interior of the tubular shell, which is suitable for setting a limit on how far a stub axle shaft and/or a carrier element can be inserted into the tubular shell in the direction of the longitudinal axis of the tubular shell. The limit stop element could, for example, be a step which narrows the hollow space. If carrier elements are introduced as far as the limit stop element, this eliminates the danger that, under the loadings during operation of the drive roller, the carrier elements migrate further in the direction of the limit stop element into the hollow space, and thereby cause problems with the bearings of the drive roller. For example, the tubular shell will have at least two, preferably three, adjacent longitudinal sections with internal diameters which differ from each other. Here, the internal diameter of at least one, preferably two and especially preferably all of the longitudinal sections will in each case be constant. The term adjacent means that the longitudinal sections are directly adjacent to each other.

It is preferable if the transition from one longitudinal section to the immediately adjacent longitudinal section with a different internal diameter is in the form of a step, preferably a right-angled one. This step is then a limit stop element. A carrier element can then only be pushed into the interior of the tubular shell up to the point where its outer diameter is greater than the internal diameter of the tubular shell—by this means a limit is simply set on the movement of the carrier element in the direction of the longitudinal axis of the tubular shell, because the step functions as a limit stop. Problems in the operation of the drive roller due to unintended migration of carrier elements towards the step can thus be avoided. A right-angled step is preferred here because it can be simply manufactured and enables the position of the limit or limit stop to be clearly defined.

In accordance with another embodiment
there is, arranged in the inventive roller
between
at least one limit stop element in the tubular shell
and
at least one carrier element
at least one spacing element.

It is then no longer possible for carrier elements to be moved into the tubular shell as far as the limit stop element, but only until the carrier elements come up against the spacing element. By the insertion of a spacing element, or the choice of its width, as applicable, the limit or limit stop for any movement of carrier elements in the direction of the longitudinal axis of the tubular shell can be varied without having to change the position of the limit stop element in the internal diameter of the tubular shell. In this way, constructional requirements of the driver in which the drive roller is being used can be simply taken into account. Different types of drivers can, for example, require different distances between the stub axle shafts, because the bearings for the axle shafts are arranged with different distances between them. Therefore, a drive roller in accordance with the invention can be deployed in different types of drivers without requiring different manufacturing processes for the tubular shell in order to position a limit stop element at different places in the tubular shell. The use of spacing elements enables different distances between the stub axle shafts to be set for a single position of the limit stop element.

In accordance with another embodiment
there is, arranged in the inventive roller
between carrier elements in different halves of the longitudinal extent of the tubular shell
at least one spacing element.

Carrier elements can then be moved into the tubular shell until they come up against the spacing element. By the insertion of a spacing element, or the choice of its width, as applicable, the limit or limit stop on any movement of carrier elements in the direction of the longitudinal axis of the tubular shell can be varied without there being a limit stop element, such as for example a step, in the internal diameter of the tubular shell. In this way, constructional requirements of the driver in which the drive roller is being used can be simply taken into account.

If the spacing element is constructed as a tube there is, for example, in this embodiment a tubular spacing element in the tubular shell.

A drive roller in accordance with the invention is not made in one piece, but incorporates several modules such as a tubular shell, a carrier element, a stub axle shaft, a surface shell extension element, and a spacing element.

A method in accordance with the invention for the manufacture of a drive roller, includes the steps of:
combining
at least the modules of
a tubular shell,
a stub axle shaft, and
a carrier element,
and, if necessary, also the steps of:
combining at least one of the modules from the group of:
a surface shell extension element and
a spacing element
with the modules of a tubular shell, a stub axle shaft, and a carrier element.

In accordance with one embodiment of the inventive method, before any module is combined with the tubular shell module the tubular shell module is shortened to a desired length.

Preferably, the tubular shell will be shortened in areas which have no limit stop element, for example steps between longitudinal sections with different internal diameters. Especially when the tubular shell is shortened to a desired length it is advantageous if there are two limit stop elements available in the tubular shell, where the distance from the end of the tubular shell to which it is nearest is different for the two elements. The distance from the limit stop element which is further away from its nearest end of the tubular shell is advantageously chosen that shortening the tubular shell to the shortest expected desired length is possible without removing this limit stop element from the piece of the tubular shell which is being reused to produce a drive roller in accordance with the invention.

If the tubular shell is being used without shortening, or is not being shortened to the shortest desired length, any gap between this limit stop element and a carrier element will be filled, for example, by one or more spacing elements.

A drive roller in accordance with the invention or a drive roller manufactured using the inventive method can be used in a rolling mill for the production of metal strip, preferably steel strip.

A drive roller in accordance with the invention, or a drive roller manufactured using the inventive method can also be used for the production of aluminum strip.

BRIEF DESCRIPTION OF THE DRAWINGS

In what follows, the present invention is described in more detail by reference to some schematic figures of examples.

FIG. 5b shows a longitudinal section through the solid roller shown in FIG. 5a.

FIG. 6a shows an embodiment of a drive roller in accordance with the invention, with steps and carrier elements which function as tubular shell extension elements, looking obliquely at a longitudinal section.

FIG. 6b shows an enlargement of a section of FIG. 6a.

DESCRIPTION OF EMBODIMENTS

Figure 1:
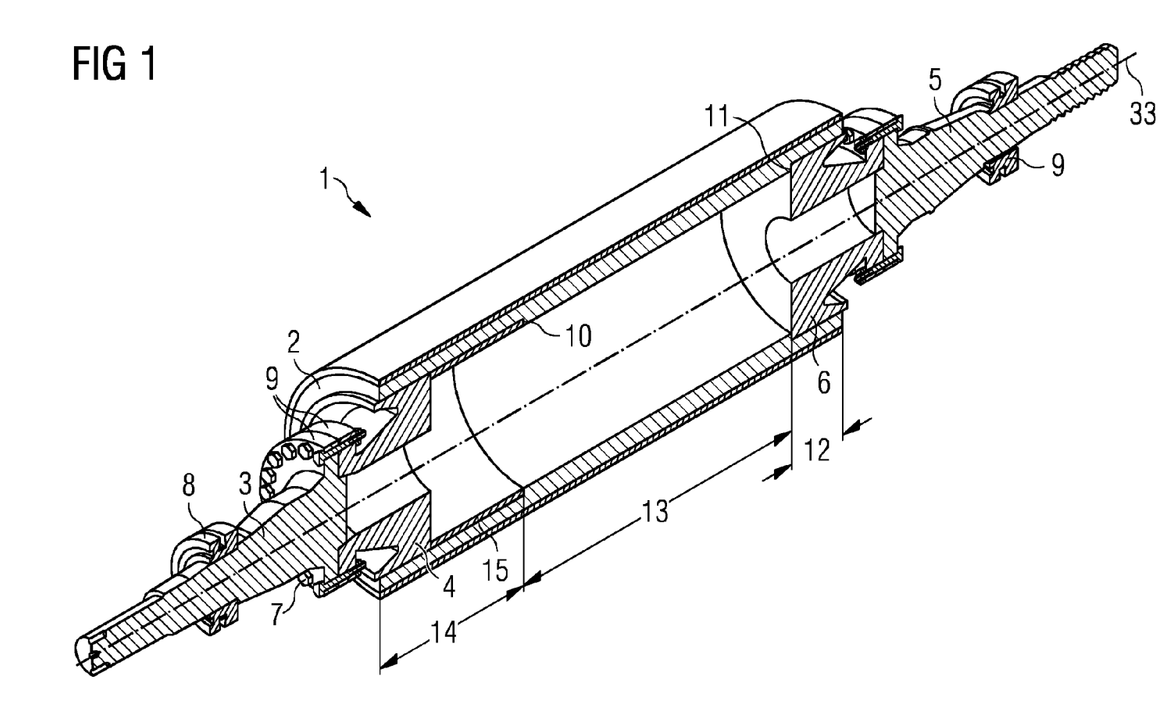
FIG. 1 shows an embodiment of a drive roller in accordance with the invention, with steps and a spacing element, looking obliquely at a longitudinal section.

FIG. 1 shows an embodiment of a drive roller 1 in accordance with the invention, looking obliquely at a longitudinal section. The drive roller 1 is a hollow roller. The roller body is a tubular shell 2. Attached onto the tubular shell is a surface layer. A first stub axle shaft 3 is indirectly affixed to the tubular shell, in the left half of its longitudinal extent, via a carrier element 4 which is itself affixed to the tubular shell 2 by means of detachable fixing arrangements. A second stub axle shaft 5 is indirectly affixed to the tubular shell, in the right half of its longitudinal extent, via a carrier element 6 which is itself affixed to the tubular shell 2 by means of detachable fixing arrangements. The longitudinal axes of the two stub axle shafts 3 and 5 are coaxial with each other, and are coaxial with the longitudinal axis of the tubular shell 2. The two stub axle shafts 3 and 5 are separate components, that is to say they are, for example, not bulges on the tubular shell component 2 or on the two carrier element components 4 and 6. The two stub axle shafts 3 and 5 are separate bodies from each other. The stub axle shafts 3 and 5 are affixed onto the carrier elements 4 or 6, as applicable, by screw joints 7 as detachable fixing arrangements, and specifically to their flanges so the stub axle shafts are flanged onto the carrier elements. For the purpose of transmitting torques from the stub axles shafts 3 and 5 to the tubular shell 2 through the flange area of the carrier elements 4 and 6, feather keys are provided in appropriate grooves, which on grounds of clarity have not been shown separately. For the purpose of transmitting torques, other constructional solutions could of course be considered, such as for example teeth or bolts, etc.

The carrier elements 4 and 6 are constructed in a ring shape and each of them has a groove running around it with a V-profile, which is concentric with the axis of rotation of the carrier element. The central area of the carrier element which is bounded by the groove is constructed as a flange, where the flange extends out beyond the outer edge of the plane formed by the face which has the groove. At its end, the flange flares out radially.

In operation, the inventive drive roller 1 rotates about the longitudinal axis of the tubular shell 2, about an axis 33 which includes the two stub axle shafts 3, 5.

Also shown are bearings 8, 9, in which the stub axle shafts 3, 5 are mounted so as to permit, in operation, a rotation of the inventive drive roller 1 about the longitudinal axis of the tubular shell 2 about an axis 33 which passes through the two stub axle shafts 3, 5.

The drive roller shown is constructed as a hollow roller. The hollow space in the roller body of the hollow roller that is the tubular shell extends along the longitudinal axis of the hollow roller over the entire longitudinal extent of the roller body tubular shell 2. In the inside diameter of the tubular shell 2, there are two limit stop elements in the form of rectangular steps 10,11 in the tubular shell 2. The tubular shell 2 has three longitudinal sections 12,13,14, which are adjacent to one another and have internal diameters which differ from one to another. In all three of the longitudinal sections 12,13,14 the internal diameter is in each case constant. The carrier element 6 is pushed into the tubular shell 2 as far as the step 11. The carrier element 4 is pushed into the tubular shell 2 as far as the spacing element 15, which is constructed as a ring. The spacing element 15 is pushed into the tubular shell 2 as far as the step 10. The drive roller 1 shown in FIG. 1 thus incorporates the modules of: a roller body, in this case, the tubular shell 2, carrier elements 4 and 6, stub axle shafts 3 and 5, and spacing element 15.

Figure 2:
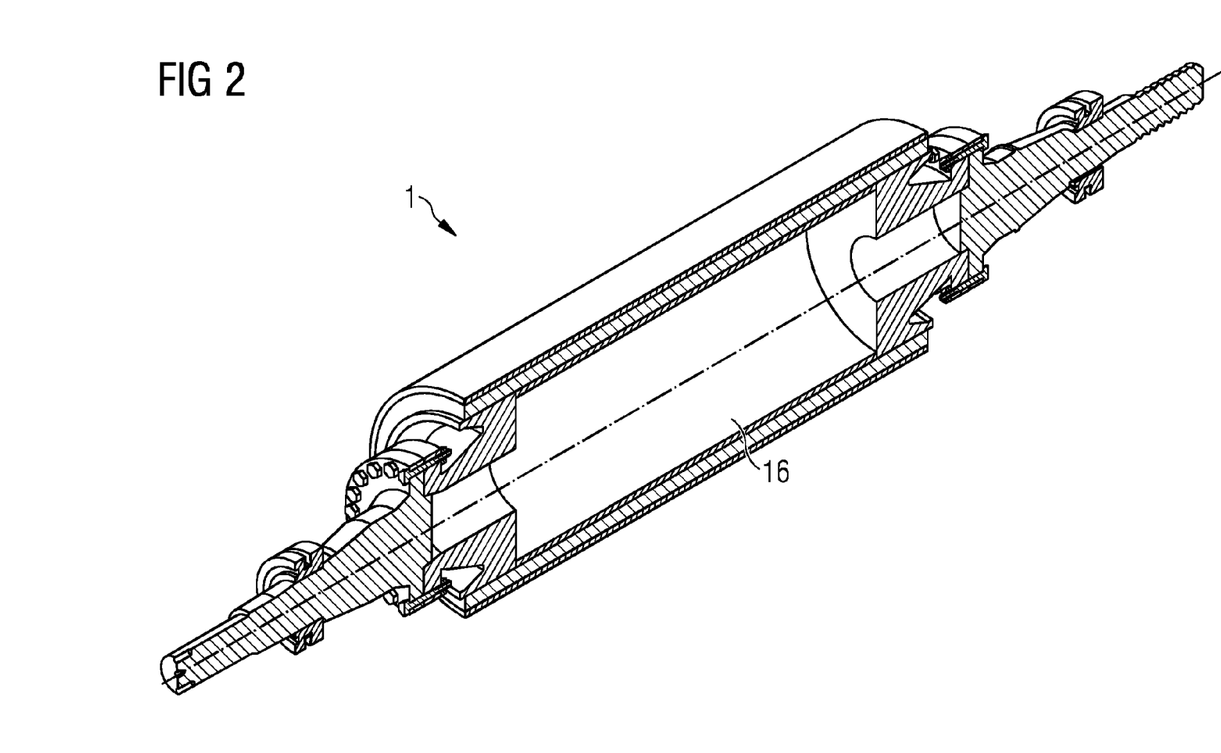
FIG. 2 shows an embodiment of a drive roller in accordance with the invention, with no steps, looking obliquely at a longitudinal section.

FIG. 2 shows an oblique view of a longitudinal section through another embodiment of the inventive drive roller 1. Parts which are the same as in FIG. 1 have the same reference marks, with the insertion of reference marks being foregone for reasons of clarity for parts which have already been adequately explained. Unlike in FIG. 1, no steps are present. Between the carrier elements 4 and 6 there is one spacing element 16. The carrier elements 4, 6 are each pushed into the tubular shell 2 up to the spacing element 16.

Figure 3:
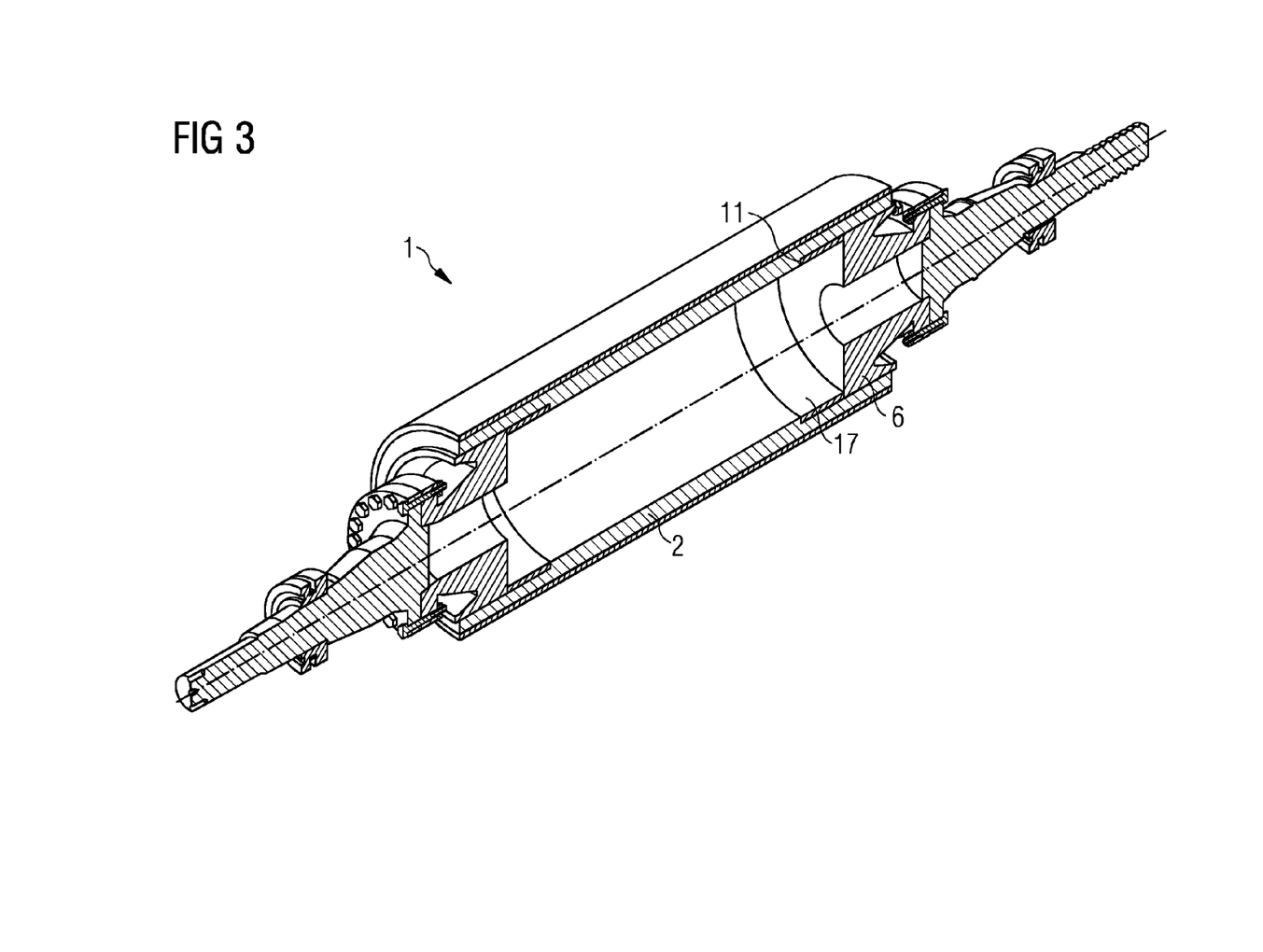
FIG. 3 shows an embodiment of a drive roller in accordance with the invention, with steps and two spacing elements, looking obliquely at a longitudinal section.

FIG. 3 shows an oblique view of a longitudinal section through another embodiment of the inventive drive roller 1. Parts which are the same as in FIGS. 1 and 2 have the same reference marks, the insertion of reference marks has been foregone for reasons of clarity for parts which have already been adequately explained. Unlike in FIG. 1, a spacing element 17 is present in addition, this being arranged between the step 11 and the carrier element 6. The carrier element 6 is pushed into the tubular shell 2 up to the spacing element 17, and the spacing element 17 is pushed into the tubular shell 2 up to the step 11.

Figure 4:
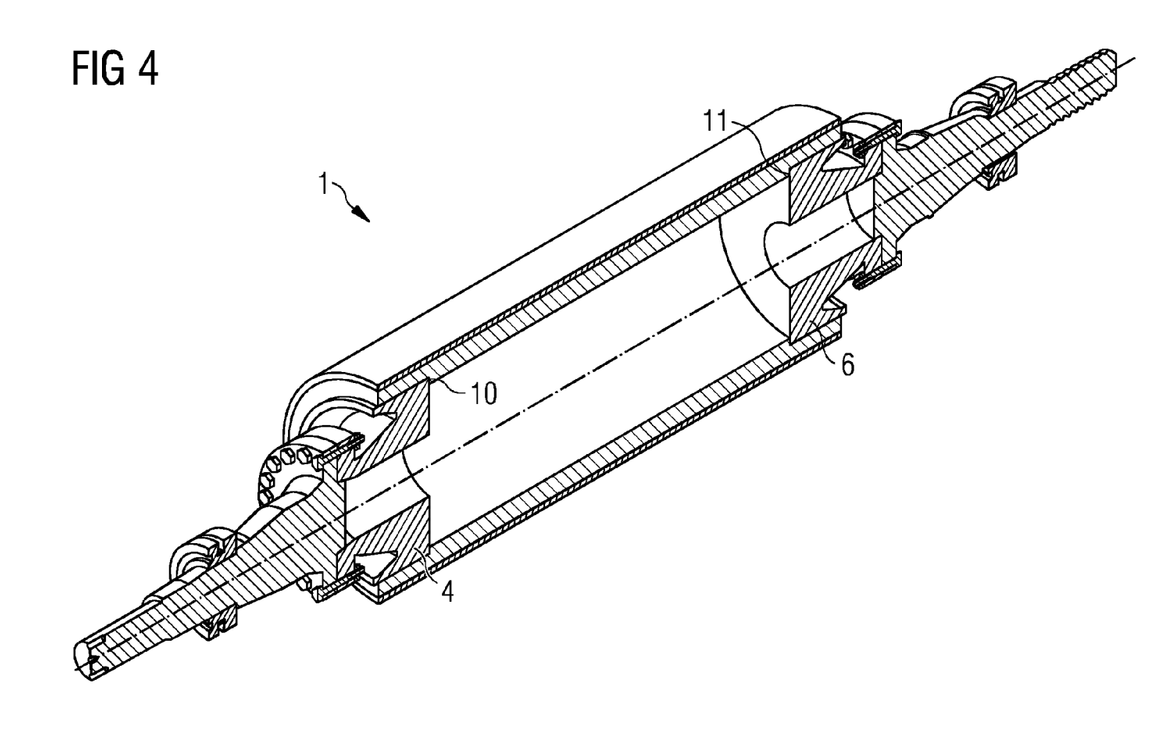
FIG. 4 shows an embodiment of a drive roller in accordance with the invention, with steps and with no spacing elements, looking obliquely at a longitudinal section.

FIG. 4 shows an oblique view of a longitudinal section through another form of embodiment of the inventive drive roller 1. Parts which are the same as in FIGS. 1 to 3 have the same reference marks; the insertion of reference marks has been foregone for reasons of clarity for parts which have already been adequately explained. Unlike in FIG. 1, no spacing elements are present. The carrier element 6 is pushed into the tubular shell 2 up to the step 11, and carrier element 4 is pushed into the tubular shell 2 up to the step 10.

Figure 5A:
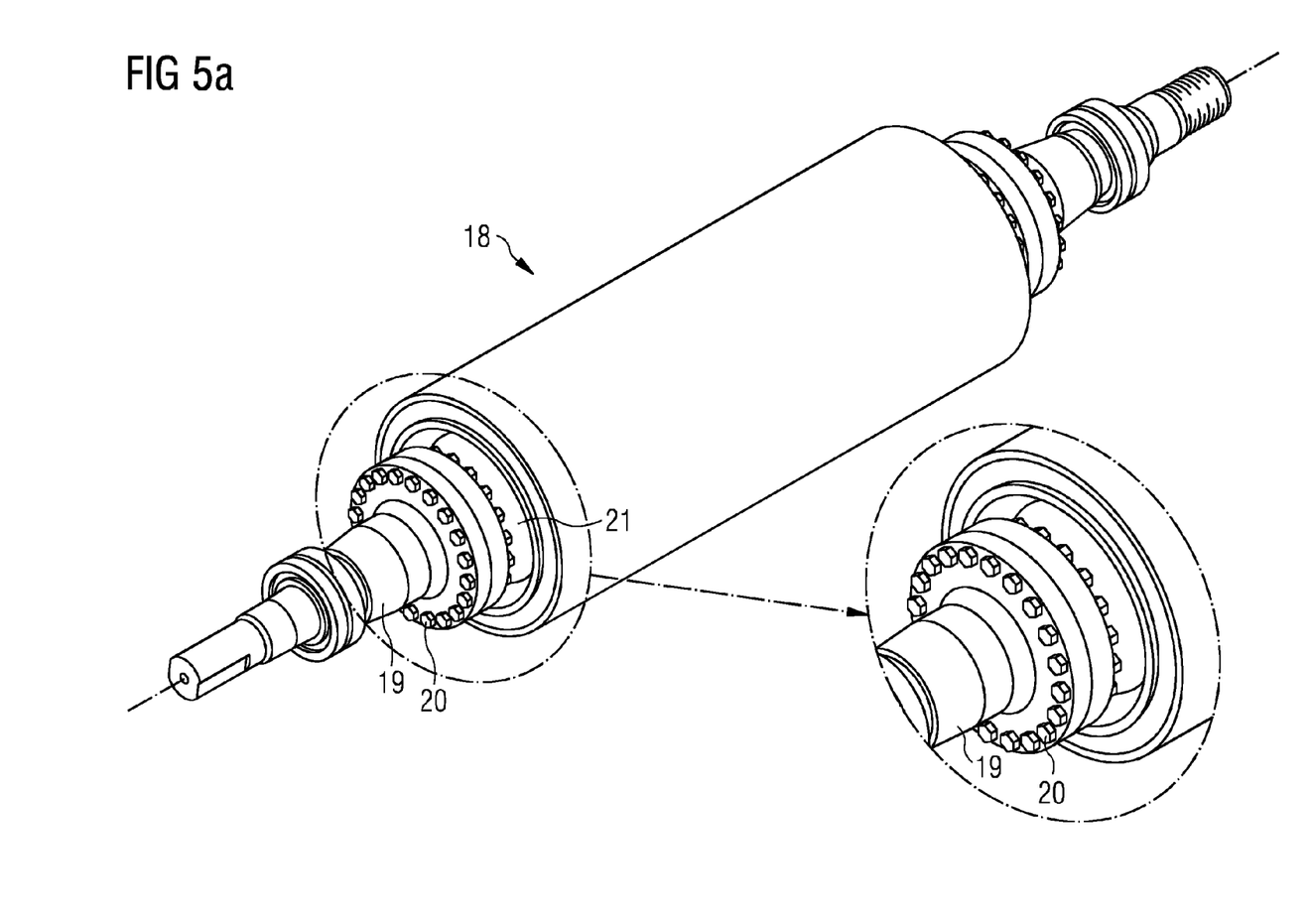
FIG. 5a shows an oblique view of a drive roller in accordance with the invention which is constructed as a solid roller.

FIG. 5a shows an oblique view of a drive roller 18 in accordance with the invention, this being constructed as a solid roller. An end section has been circled and shown in enlargement. It can be seen that a stub axle shaft 19 is affixed specifically is flanged on detachably by means of screw joints 20, as the detachable fixing arrangement, onto the carrier element 21 of the drive roller 18. It is flanged onto the flange of the ring-shaped carrier element which has a groove.

Figure 5B:
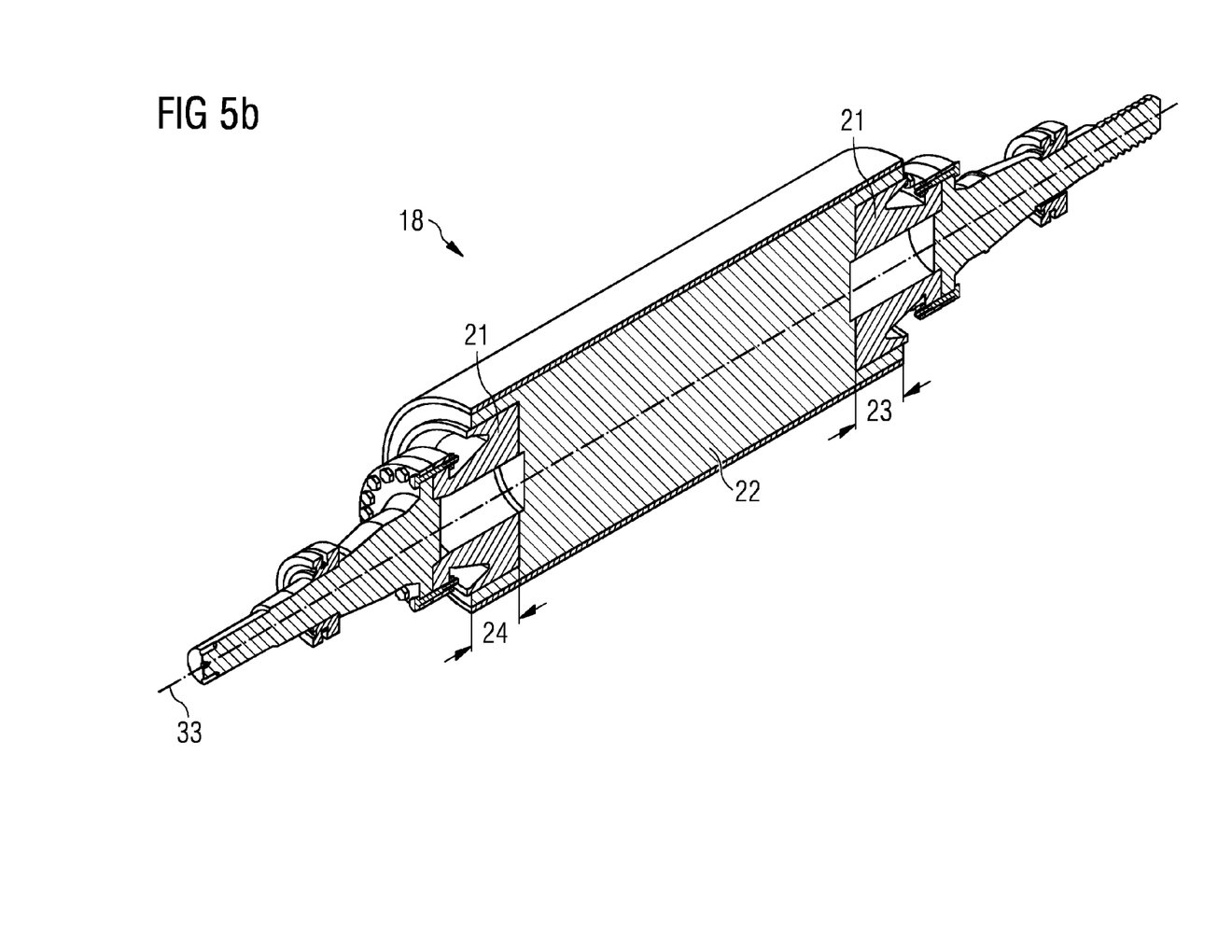

FIG. 5b shows a longitudinal section, analogous to the longitudinal section of the hollow rollers in FIGS. 1 to 4, of the drive roller shown in FIG. 5a. The roller body 22 has two hollow spaces 23 and 24 extending along its longitudinal axis, into which the carrier elements 21 are inserted. The two hollow spaces 23 and 24 do not extend over the entire longitudinal extent of the roller body, because this is a solid roller. The ends of the two hollow spaces act as limit stop elements and the two carrier elements are introduced into the hollow space as far as these ends.

There could also be only one single stub axle shaft present.—The inventive drive roller would then, in operation, rotate for example about an axis which would be formed by this stub axle shaft and a stub-axle-shaft-like projection on the roller body. In this case, unlike the stub axle shaft, the stub-axle-shaft-like extension would not be a separate component, but simply an extension on the roller body.

A variant of this type is not shown separately, because the part of the inventive stub axle shaft which is important to the invention would not differ from the Figures provided.

Figures 6A, 6B:
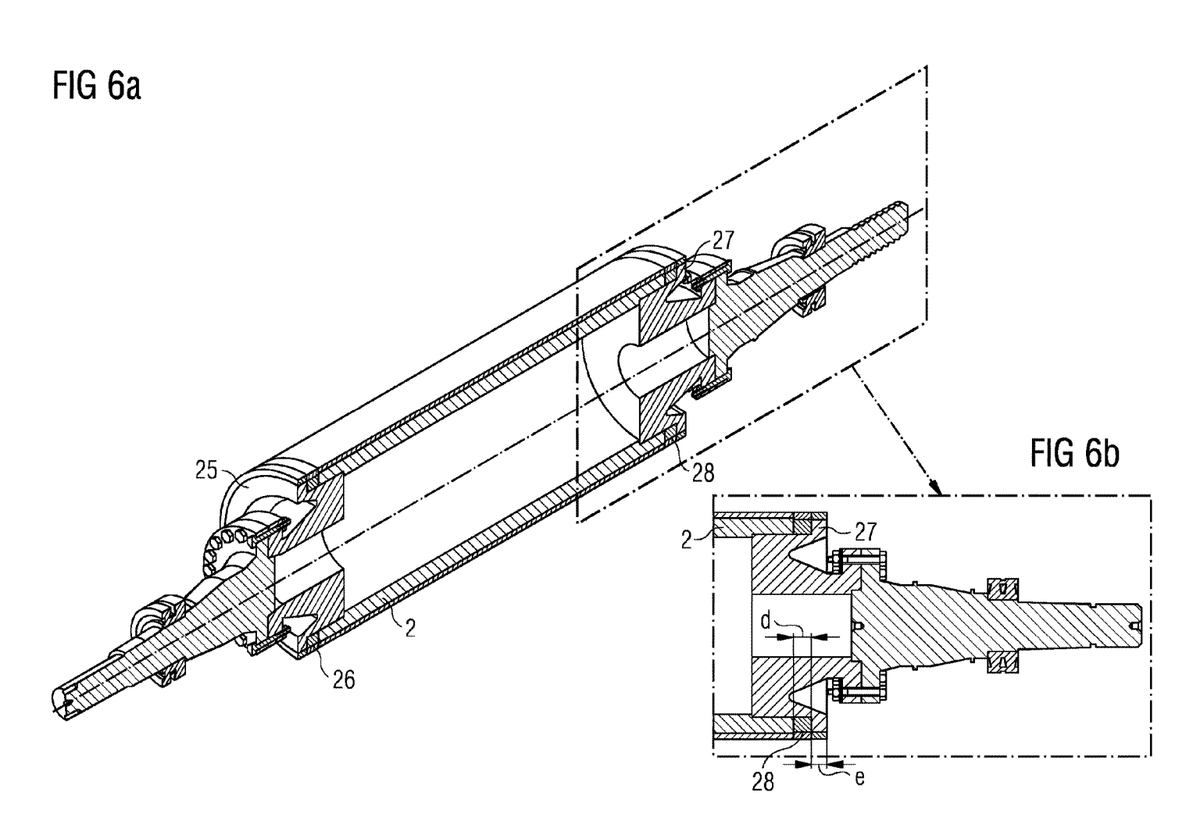

FIG. 6a shows an oblique view, largely analogous to FIG. 4, of a drive roller in accordance with the invention. However, unlike in FIG. 4, there is here a tubular shell extension element 26 present between the tubular shell 2 and the carrier element 25, and between the tubular shell 2 and the carrier element 27 there is a tubular shell extension element 28. The tubular shell extension elements 26 and 28 are constructed with a ring shape, as wear rings sleeved onto the carrier elements. In the drive roller illustrated, they are located between the relevant carrier element 25, 27 and the roller body tubular shell 2; they are clamped in between these and, if necessary, are secured against rotating, this not being separately shown. Security against rotation can be effected, for example, by means of feather keys, bolts, welded seams etc.

In addition, the two carrier elements 25 and 27 also function as further tubular shell extension elements. This can be seen in FIG. 6b, which shows an enlargement of the right hand section of FIG. 6a. The effective width of the drive roller is enlarged both by the tubular shell extension elements 26 and 28 and also by the carrier elements 25 and 27.

Figures 7A, 7B:
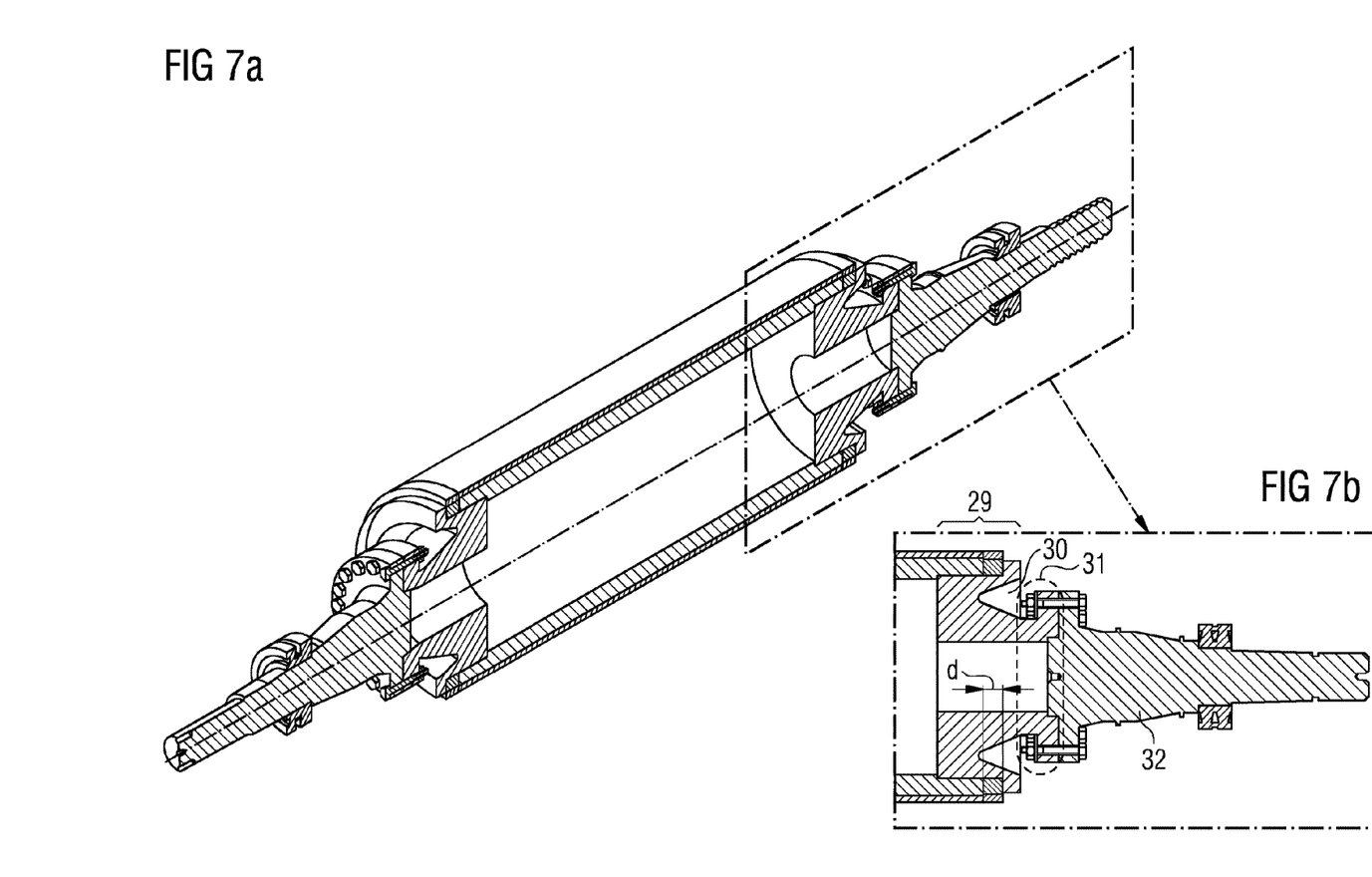
FIGS. 7a and 7b show embodiments which are largely analogous to those in FIGS. 6a and 6b, in which the carrier elements do not function as tubular shell extension elements.

FIGS. 7a and 7b show a situation which is broadly analogous to FIGS. 6a and 6b, with the difference that here the carrier elements do not function as tubular shell extension elements. Also shown in FIG. 7b is the carrier element 29 with a groove 30 in its end face, and the flange 31 which is enclosed in the dashed line, onto which is flanged the stub axle shaft 32.

Although the invention has been illustrated and described in detail by preferred exemplary embodiments, the invention is not restricted by the examples disclosed, and other variations can be derived from them by the specialist without going outside the scope of protection for the invention.

LIST OF REFERENCE MARKS

1 Drive roller
2 Tubular shell
3 Stub axle shaft
4 Carrier element
5 Stub axle shaft
6 Carrier element
7 Screwed joint
8 Bearing
9 Bearing
10 Step
11 Step
12 Longitudinal section
13 Longitudinal section
14 Longitudinal section
15 Spacing element
16 Spacing element
17 Spacing element
18 Drive roller
19 Stub axle shaft
20 Screwed joint
21 Carrier element
22 Roller body
23 Hollow space
24 Hollow space
25 Carrier element
26 Tubular shell extension element
27 Carrier element
28 Tubular shell extension element
29 Carrier element
30 Groove
31 Flange
32 Stub axle shaft
33 Axis

The invention claimed is:

1. A drive roller, comprising:
a roller body module;
at least one stub axle shaft module, which is a separate component from the roller body module, the at least one stub axle shaft module being arranged so that a longitudinal axis of the at least one stub axle shaft module is coaxial with a longitudinal axis of the roller body module; and
at least one carrier element module affixed to the roller body module by detachable fixing arrangements so that a longitudinal axis of the at least one carrier element module is coaxial with the longitudinal axis of the roller body module, wherein:
the at least one stub axle shaft module is affixed indirectly to the roller body module through the at least one carrier element module,
the carrier element module has a ring- or disk-shape, with a groove in an end face of the ring- or disk-shaped carrier element module,
the carrier element module comprises a flange, onto which a flange of the stub axle shaft module is connected by at least one connector passing through the flange of the carrier element module and the flange of the stub axle shaft module, the flange of the carrier element module being flared out radially so that an outer edge of the flange of the carrier element module is at a greater radial distance from the longitudinal axis of the at least one carrier element module than an outer edge of a portion of the carrier element module to which portion of the carrier element module the flange of the carrier element module is connected, and
the groove is a circular groove.

2. The drive roller as claimed in claim 1, wherein the groove runs concentrically with an axis of rotation of the carrier element module.

3. The drive roller as claimed in claim 1, wherein a central area of the carrier element module which is bounded by the groove is in the form of a flange.

4. The drive roller as claimed in claim 3, wherein the central area, constructed as a flange, projects beyond a plane extending across an outer edge of the face which has the groove.

5. The drive roller as claimed in claim 1, wherein the groove has a profile from the group consisting of:
 a V-profile,
 a U-profile, and
 a rectangular profile.

6. The drive roller as claimed in claim 1, wherein the roller body module has at least one hollow space, extending along its longitudinal axis.

7. The drive roller as claimed in claim 6, wherein in the at least one hollow space there is at least one limit stop element.

8. The drive roller as claimed in claim 7, wherein at least one spacing element is arranged between the at least one limit stop element and the carrier element module.

9. The drive roller as claimed in claim 6, wherein the at least one hollow space extends along an entire lengthwise extent of the roller body.

10. The drive roller as claimed in claim 1, wherein an effective width of the drive roller is formed by a surface shell of the roller body module and a surface shell extension element.

11. The drive roller as claimed in claim 10, wherein at least one surface shell extension element is a carrier element.

12. The drive roller as claimed in claim 10, wherein the surface shell extension element is located between the carrier element module and the roller body module.

13. The drive roller as claimed in claim 1, wherein a surface of the groove extends beyond an end of the roller body module.

14. A method for manufacture of the drive roller of claim 1, the method comprising the steps of:
 combining at least the modules of the roller body, stub axle shaft, and carrier element.

15. The method as claimed in claim 14, further comprising shortening the roller body module to a desired length before combining any module with the roller body module.

16. The method as claimed in claim 14, further comprising the step of combining at least one of the modules from the group: surface shell extension element, spacing element, and limit stop element with the modules roller body, stub axle shaft and carrier element,
 wherein the surface shell extension element is positioned between the carrier element and the roller body, the spacing element is positioned inside the roller body adjacent to the carrier element, and the limit stop element is positioned inside the roller body configured to be between the spacing element and a hollow space of the roller body.

17. A method for producing a metal strip in a rolling mill, the method comprising adjusting the tension of the metal strip using a drive roller as claimed in claim 1.

18. The method for producing a metal strip in a rolling mill according to claim 17, wherein the metal strip is a steel strip.

19. The method for producing a metal strip in a rolling mill according to claim 18, wherein the rolling mill comprises a hot strip coiling facility for steel strip.

* * * * *